Patented Apr. 15, 1930

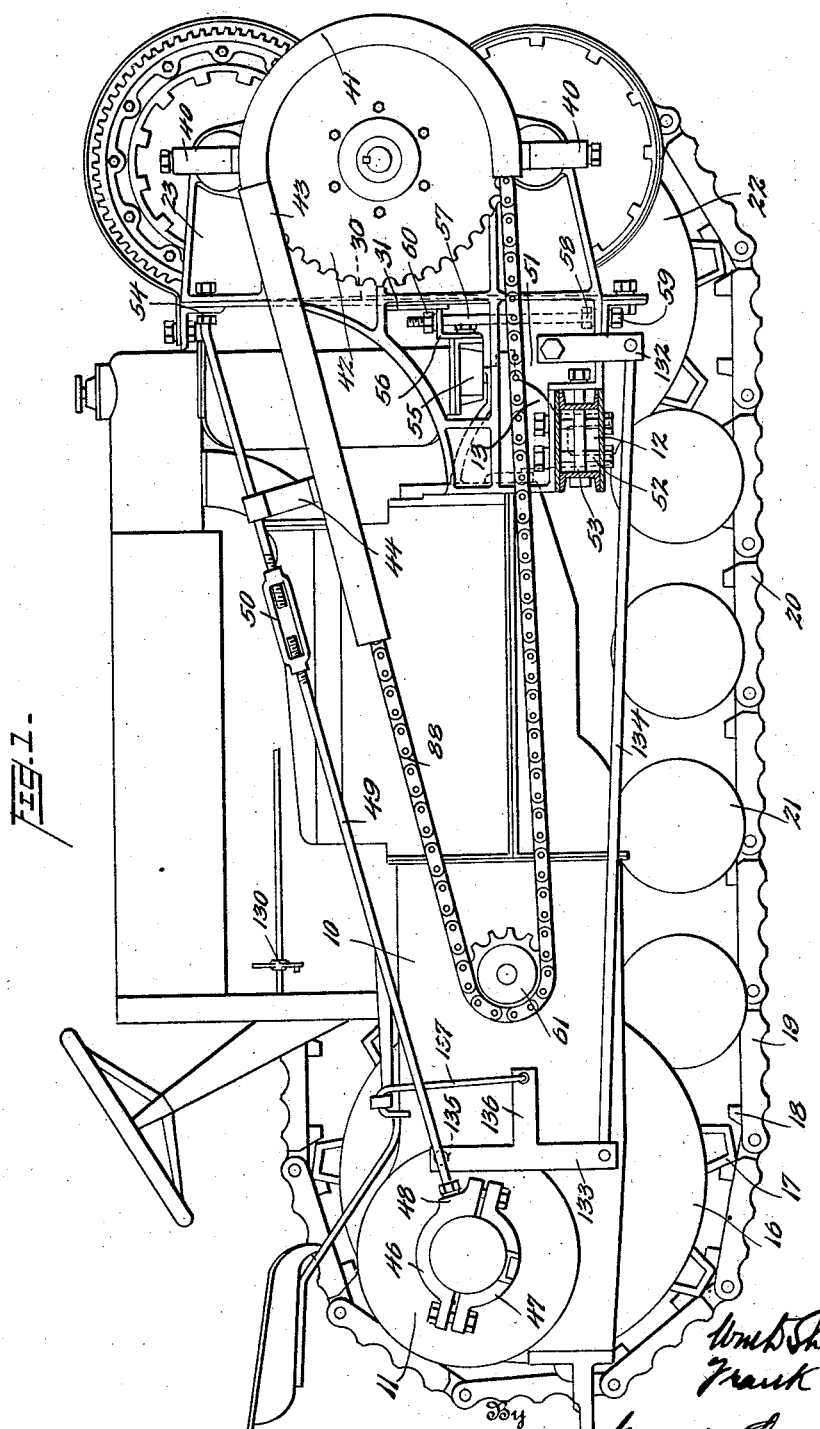

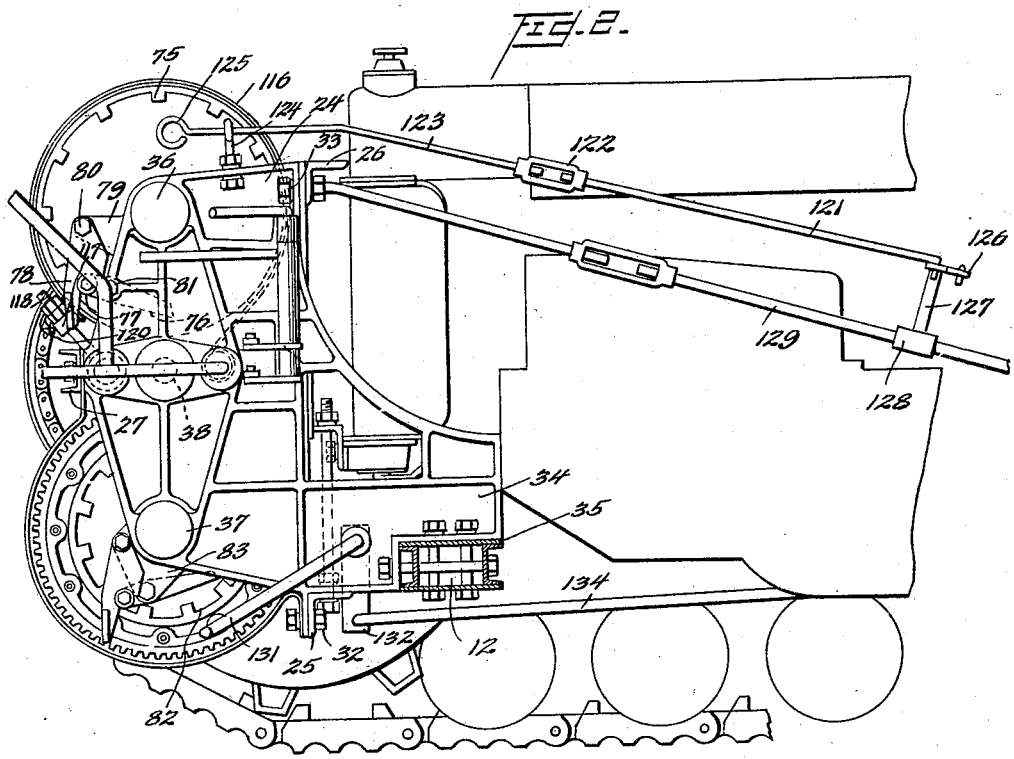
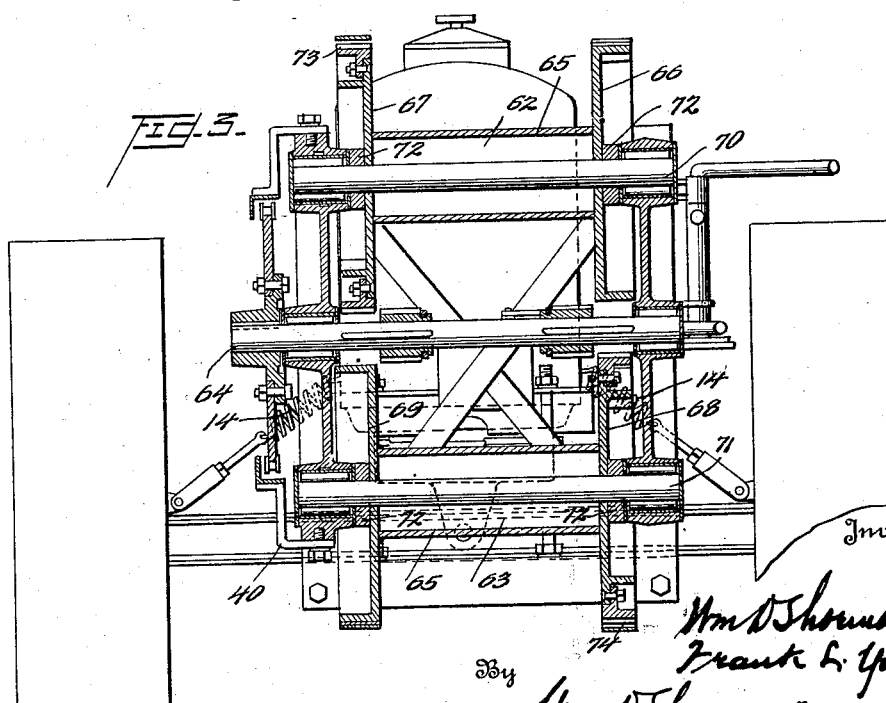

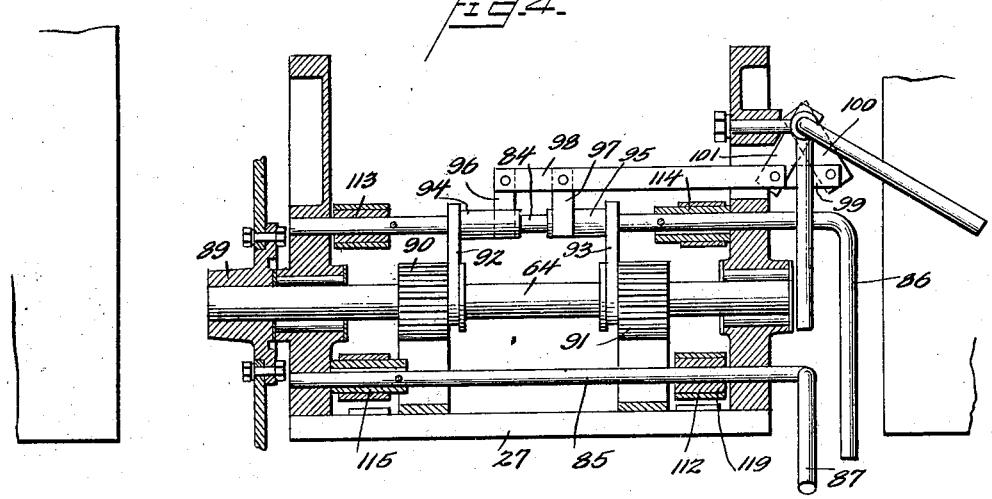

1,755,136

UNITED STATES PATENT OFFICE

WILLIAM D. SHOEMAKER, OF DRUMMOND, AND FRANK L. YOUNG, OF CHEVY CHASE, MARYLAND; SAID YOUNG ASSIGNOR TO SAID SHOEMAKER

TRACTOR-EQUIPMENT COMBINATION

Application filed August 6, 1928. Serial No. 297,678.

This invention has relation to tractor equipment and more particularly to the mounting of such equipment upon the tractor and to the combination of elements in spaced relationship comprising a double drum winch unit.

While the invention has been illustrated in connection with a double drum winch attachment for tractors and has a special application to this type of equipment and a special application to the specific arrangement and construction of winch elements in such a unit, it will be understood that it also has application to other pieces of tractor equipment. Therefore, in the following description, which will be confined to a winch attachment of this type, it will be appreciated in that so far as the mounting employed is concerned the specific construction or character of the attachment is largely illustrative.

Equipment in the nature of tractor attachments have been mounted upon both the front and the rear of the tractor, and when so mounted have been driven from the tractor power plant by taking the power from a belt pulley shaft projecting from any suitable part of the tractor and independent of the tractor transmission. Some pieces of tractor equipment are more useful when mounted upon the rear end, others find their greatest usefulness when mounted upon the front of the tractor. Hoists or winch attachments have been mounted upon both ends of the tractor and have been found mounted upon tractors which are equipped with special wheel substitutes, as endless rail tracks, extending the full length of the tractor or employed as substitutes for the tractor wheels only. The present invention has relation to a tractor equipment combination in which there is a special relationship between the tractor and equipment and the wheel substitutes employed.

The object of the invention is to produce a tractor equipment combination carrying out the special relationship between the tractor, the equipment and the wheel substitutes. Another object is to design a mounting for tractor equipment whereby the weight of, and the strains developed by, the equipment are borne jointly by those portions of the wheel-substitute-equipped tractor capable of sustaining them.

A further object of the invention is the production of a mounting for a piece of equipment whereby the weight is carried by the heavy wheel-substitutes on which the tractor is mounted, while at the same time making provision for the proper presentation of the drive element of the tractor for efficient operation of the equipment.

A further object is the production of an efficient front end mounting of a piece of tractor equipment where wheel substitutes are employed with the tractor, and where the drive equipment is secured to the belt pulley shaft projecting from the side of the tractor.

A further object of the invention is the improvement of the details of construction, location of controls, increase of facility in use of a double drum winch combination for attachment to a tractor.

Other objects and advantages of the invention will hereinafter appear and the novel features thereof will be particularly pointed out in the appended claims. Like reference numerals indicate like parts throughout the several figures of the drawings, in which:

Fig. 1 is a side elevation of a tractor equipped with full wheel-substitutes and having mounted thereon the double drum winch combination, one set of wheel-substitutes and associated parts being removed in order to show the detail of the mounting.

Fig. 2 is a similar view of the forward end of such a tractor designed to show the opposite side of the mounting and the opposite end of the winch unit.

Fig. 3 is a vertical section taken through the winch unit.

Fig. 4 is a longitudinal section through the winch unit showing the system of gear shift and brake control.

Fig. 5 is a view of several of the parts of the mounting disassociated from the remaining elements; and Figs. 6 and 7 are detailed views of parts.

For the purpose of aiding in a clear description the mechanism selected for illustrations will be divided into assemblies as follows:

1. The tractor wheel-substitute assemblage, comprising the mounting of the tractor upon the wheel substitutes.
2. The winch unit frame construction, including the stationary parts of the winch unit.
3. The mounting of the equipment frame upon the tractor and wheel substitute.
4. The spool and drive assemblies of the winch unit.
5. The control system of the winch unit.

Each of these assemblies will be described in detail and the individual functions thereof pointed out, after which their conjoint operations will be set forth. The tractor 10 is usually equipped with front wheels which are steered in the travel of the tractor and with rear tractive wheels mounted upon the ends of the housing 11 of the differential gear. To make the traction more effective wheel substitutes are employed in lieu of the wheels, sometimes taking the place of but two wheels and at other times taking the place of the four. In the illustration on the drawing a full crawler type of wheel substitute takes the place of the four wheels. In lieu of the front axle of the tractor a heavy beam 12 is employed on which the central portion 13 of the front of the tractor rests and on which said front end of the tractor has a limited swing movement. It is not unusual to cushion the front end of the tractor on this beam by means of springs 14 or of rubber blocks. It will be appreciated that in the movement of the tractor from place to place it is desirable to take up the jar of travel in this way.

At the ends of the beam the front portion of side frames 15 of the crawler (not shown) are attached. The rear portions of these side frames are secured to the axle housing at the place where the wheels are usually mounted. It will be appreciated that the drive of the crawler is through the axles of the tractor extending through the axle housings from the differential and that the driving sprockets 16 have teeth 17 which engage with lugs 18 on track shoes 19, which are hingedly connected in a series to form an endless track 20, driven by the sprockets 16. The side frames are also provided with guide wheels 21 running on the under face of the track 20 and supporting the tractor on said track. The side frames also have the guide sprockets 22 mounted therein by means of which the track is turned at the front of the machine.

These parts are well known in the art and constitute a tractor quite different from the ordinary four wheel farm tractor in that it is a machine of considerably more weight, greater tractive power, and controlled in a quite different manner. The guiding is done by employing brakes on the rear sprockets and these brakes are applied through the medium of the steering wheel of the tractor. This tractor combination is able to support greater weight and travel over rougher country. While the ordinary farm tractor would work more efficiently if weight were added to the rear thereof, it is necessary in a tractor equipped in the manner just described to apply the excess weight at the front as it is the forward portion or toe of the endless track that first engages the ground in the travel of the track and is therefore the part which should have the weight in order to make the contact sufficiently secure to produce the best results.

The mounting, therefore, of a piece of equipment on such a tractor should be, as far as is practicable, on the front, although the underlying principle of some of the features of this invention might be employed in rear end equipment, especially when the half tracks or substitutes for the rear wheels only are present.

To support the equipment on the tractor there has been provided side frames 23 and 24 made of cast steel and suitably ribbed at their middle portions to provide the necessary strength. Lower cross angle 25 and upper cross angle 26 and a front channel 27 are provided for the purpose of bracing the two side frames in spaced relationship, while a bridge brace 28 consisting of a long diagonal member 29, two short diagonal members 30 and 30' and central plate 31 are utilized to stiffen the base of the winch frame. It will be noted that the bridge brace is secured by the same bolts 32—33, which unites the cross angles to the side frames.

The side frames are extended rearwardly and the extension is indicated by the numeral 34 at the lower end of which a plate 35 is placed for the purpose of permitting the side frames to rest upon the beam 12. The upper portion of this extension is curved gracefully forward and upward to the cross angle 26.

In the side frames in vertical alignment are mounted the upper spool bearings 36, lower spool bearings 37 and drive shaft bearing 38. These bearings are provided with covers to protect them, as is usual. The frame sides are also provided with bearing apertures in which are mounted brake control shafts and a sliding gear control shaft. On the frame 23 are extensions to the bearing blocks 36 and 37, tapped bosses 39, by means of which supporting legs 40 are attached by machine screws, and these legs support a curved guard 41 encircling more than half of the periphery of the large driven sprocket 42 of the winch. A chain guard 43 for a portion of the upper reach may be supported by a strap 44 from a brace rod to be hereinafter referred to.

To the rear of the channel 27 is attached the pinion guards 45 made of a single piece of material and protecting about four-fifths of the circumference of the drive pinions. Clamp members 46—47 encircle the axle housing 11 of the tractor and are clamped together by the bolts shown in such a position as to present a tapped opening 48 for the attachment of a brace rod 49 extending forwardly to the upper end of the winch frame; this brace rod has a turn buckle 50 therein. It will be appreciated that these clamps and brace rod are duplicated on the opposite side of the machine.

The winch unit is attached to the combined tractor and wheel substitute by supporting the shouldered portion 51 of the frame upon the beam 12 and tying it thereto by the vertically disposed bolts 52 and the horizontally disposed bolts 53. The upper portion of the frame is tied to the axle housing by means of the brace rod 49 which is attached at 54 to the frame; in fact the end of the brace rod passes through the members of the frame and is utilized in place of a bolt if that is found desirable. The supporting of the frame upon the beam 12 places the weight of this substantial piece of tractor equipment upon that part which is designed to carry such weights and not upon a portion of the tractor which is not so designed. It will be appreciated however that the tractor power plant itself rests upon this beam 12 and has a slight swinging movement on said beam which is controlled or supported by any suitable cushioning means as springs or rubber blocks. It will be appreciated that the use of the rods 49 tying the upper portion of the winch frame to the rear of the tractor, which has not the same relative movement with respect to the beam that the front part of the tractor has, will enable the power plant to swing this limited extent without interfering with the winch unit, the brace rods being sufficiently flexible to accomplish this result.

The mounting of the unit upon a rigid part of the wheel substitute and tying it to the rear of the tractor in such a way to permit the usual swinging movement between the front of tractor and supporting beam, is of itself a substantial advance in tractor equipment. To this feature, however, is added means for making steady or rigid the tractor power plant with the wheel substitute and the winch unit, when the tractor is brought to rest for the purpose of using the winch. This means is made up of parts which are standard in a front end mounting for tractor equipment, the subject of a companion application for patent filed in the name of Frank L. Young and bearing Serial Number 259,296 and dated March 5, 1928. It comprises a modified tractor casting 55 which has been provided with taps for the purpose of permitting the attachment of the angle 56, which angle is provided with openings. Adjusting rods 57 pass through the openings in the horizontal leg of the angle 56 and through aligned openings in the lower portion of the winch frame and the cross angle 25. These rods are mounted so that they will be supported at their lower end where the nuts 58 and 59 lock the rod to the winch frame. A lock nut 60, which may be reached through an opening in the side frames of the winch, will enable one to tie the winch frame to the tractor power plant by tightening up this nut against the upper face of the angle 56. Since the frame is already rigidly connected to the beam 12 it follows that the tightening of these lock nuts 60 will also rigidly tie the front end of the tractor to the wheel substitutes. It is desirable to have these parts tied together in this way in order that the chain which is employed to transmit power from the sprocket 61 to the sprocket 42 shall work smoothly and also to absorb the vibrations of the tractor power plant while it is being employed as a stationary engine for the winch.

It will be appreciated that upon a loosening of the lock nuts 60 the front end of the tractor will again be permitted to freely move with respect to the wheel substitute. For the purpose however of being sure that the nuts 60 do not fall from the end of the rod 57, said end is upset or otherwise formed to prevent this.

The spools 62 and 63 are mounted with their bearings in vertical alignment and between them is the winch drive shaft 64. The spools are formed of shanks 65 welded to steel disks 66, 67, 68 and 69. All of these parts are mounted upon spool shafts 70 and 71 and are spaced from the bearings by means of blocks 72. The disks 66 and 69 are formed with a flange constituting a brake drum for the spool. The disks 67 and 68 are formed so as to have bolted thereto ring gears 73 and 74. It will be appreciated that the drum on one spool corresponds in position with the gear on the companion spool, and this is for a purpose to be hereinafter described.

The brake drums have attached to them lugs 75 on their inner faces with which a holding pawl 76 co-operates to hold the spool in position, and this holding pawl has a heel 77 which is actuated by a tripper 78. The winch frame is provided with suitable means for pivotally supporting the pawl and the tripper. For this purpose a lug 79 projects forwardly from the upper portion of the frame and at its end is provided with a bearing for any suitable pintle or the like, 80, for the tripper. The web of the winch frame is also provided at 81 with a bearing aperture, by means of which the pawl may be pivoted. The parts just described are quite analogous to the pawl assembly, which is the subject matter of an application for patent by Frank L. Young, filed Dec. 9, 1927, and serially numbered 238,841, to which application reference is now made for a more complete disclosure of this element.

In order that the lower spool shown in Fig. 2 may likewise be controlled by a pawl, it is necessary to provide the disk 68 with a lug ring and this may be attached by welding at a point within the line of attachment of the ring gear to this disk. I prefer to make this separate rather than making it a part of the ring gear because the ring gear of this winch unit is the same as the ring gear of other winch units which may be considered as companion equipment; otherwise the ring gear may be formed to provide these lugs. It will be noticed that both the upper and the lower spools are provided with this lug ring. This is done so that these spools may be reversed in position at any time that the user may desire it. In order to accommodate the pawl 76 and the tripper 78 to a spool equipped with a lug ring, it is necessary only that the attaching lug 83 for the pintle of the pawl and tripper shall be made to conform to the smaller diameter of the lug circle, as will be clearly apparent from a glance at the lower portion of Fig. 2.

Mounted in horizontal alignment with the drive shaft 64 are oscillating rods 84 and 85. These are bearings in the side frame and extended and bent to form the handles 86 and 87.

The winch spools described obtain their power from the small sprocket 61 over which passes the drive chain 88 which imparts its power to the large sprocket 42. The sprocket is mounted on a hub 89 secured in any suitable manner to the shaft 64. This shaft 64 has slidably mounted on it the companion pinions 90 and 91, provided with the usual keyways coacting with a key on the shaft 64. Yokes 92 and 93 movable with the couplings 94 and 95 engage the pinions and cause them to be moved into and out of mesh with the spool gears. It will be appreciated that the pinion 90 will mesh with the gear 73 and the pinion 91 with the gear 74, when they are slipped to the limit of their movement toward the adjacent frame members. While in the position shown in Fig. 4 these pinions are encircled by the guards 45.

To accomplish the sliding movement of the pinions on the shaft 64 the couplings 94 and 95 are slidable on the rod 84, and for this purpose they have projecting from them connectors 96 and 97 which engage respectively links 98 and 99, which in turn are connected to levers 100 and 101. It will be appreciated that upon a movement of these levers the link will cause the connector, coupling and yoke to be moved with it and thereby effect a sliding of the pinion.

The means whereby the levers 100 and 101 are mounted and operated will be understood from a description of Fig. 6 wherein the frame member 24 is shown as supporting upper and lower sleeves 102 and 103 by means of bolts 104 and 105 passing through apertured bosses 106 and 107 and having their heads welded to the sleeves 102 and 103.

In the aligned openings in the sleeves 102 and 103 is mounted a shaft or rod 108 which is bent at its upper end into a handle 109 and at its lower end has fixedly secured the lever 101. Between the sleeves 102 and 103 there is mounted on this shaft 108 a long sleeve 110 to which is welded or otherwise suitably secured a second shift handle 111 and also the lever 100. It will be appreciated that the two shift handles 109 and 111 may be operated separately and that as a consequence the pinion 90 may be operated without affecting the pinion 91, and likewise the pinion 91 may be operated without affecting the pinion 90. It will be also obvious upon a study of the relative position of two levers that they might be joined together as by a suitable clamp which will position them in vertical alignment, in which case they may be operated in unison whereby when the pinion 90 is in mesh with its spool gear the pinion 91 will be out of mesh; likewise when the pinion 91 is in mesh the pinion 90 will be out of mesh. The purpose of this construction is to provide in a single double drum winch the capability of either individual control of the spools or unitary control, as where a drag line operation is desired. The levers 109 and 111 are positioned at an elevation with respect to the tractor whereby they will be handy to the operator, and they are so positioned with respect to each other that only a slight movement of the hand is required to jump from one to the other of these levers, it being understood that the operator will selectively shift these levers and always with the same hand.

The rod 84 and the rod 85 have other functions. They are utilized as a support for the brakes of the drums. Each brake band encircles its drum for a very large portion of its circumference, and at one end the brake band is looped about an eccentric, while the other is attached to an adjusting means. The eccentrics and adjusting means for these brake bands are mounted upon the rods 84 and 85. The adjusting element for the brake band of the upper drum is indicated by the numeral 112, while that for the lower drum is indicated by the numeral 113. The eccentric 114 controls the brake band of the upper drum while eccentric 115 controls the brake band of the lower drum. It will be understood that these companion members are identical in construction; therefore a detailed description of but one will be necessary.

The brake band 116 is looped about the eccentric 114, this eccentric being shown as cottered to the rod 84, and it will be appreciated that when the handle 86 is moved through an arc of a circle the eccentric 114 will draw up on the brake band to apply fractional grip to the drum associated with said brake band. The opposite end of the brake band is welded to a sleeve 117 which is mounted upon a rod 118, which in turn is carried by a sleeve 119 loosely mounted upon part 112 which is secured to the rod 85. Lock nuts 120 hold the sleeve 117 on the rod 118 in proper adjustment. It will be appreciated that this adjustment may be altered at pleasure by simply manipulating the lock nuts 120 in the usual manner.

From this description of the brake and its mode of operation it will be readily understood how an operator standing to the side of the machine may apply the brake to either one or the other of the drums by selecting the handle 86 or 87 for manipulation.

To control the supply of fuel to the engine from a point at the side of the winch there is provided a control rod 121 which is shown with a turn buckle 122 therein, although it will be understood that a turn buckle is not necessary. The forward end of this rod is bent at 123 and passes through a supporting eye 124 mounted on the side frame 24 in the usual manner. A terminal loop 125 for the easy manipulation is provided. The rear end of the rod 122 is attached in a suitable manner to a bell crank 126 which in turn is supported on a stub shaft 127 attached to a sleeve 128 fixedly supported on the brace rod 129. From the bell crank 126 a link or rod extends to the tractor gas control on the opposite side of the machine and indicated by the numeral 130 in Fig. 1. It will be appreciated that by this extension gas control the operator of the winch may supply the necessary fuel for fast or slow operation as needs demand.

An extension clutch control is provided and comprises a pedal 131 which is a bent crank end of a transverse rod mounted in the side frames of the winch. At the opposite side of the machine this rod carries a lever arm 132 which in turn is connected to a bell crank 133 by the link 134, the bell crank 133 is pivoted at 135 to the differential housing and carries the arm 136 which is employed to support the hook 137 engaging over the end 138 of the tractor clutch control. It will be appreciated that upon a depression of the pedal 131 the transverse rod will cause the link 134 to be shifted backwards and this in turn through the bell crank 133 will cause the clutch pedal to be depressed and relieve the application of power to the small sprocket 61.

From the foregoing description the operation of the individual parts of the mechanism will be apparent. It remains only to complete the disclosure to recite the conjoint operation of these parts.

When the tractor is equipped with a piece of equipment too heavy to be carried by the tractor itself there is added to the combination a carrying device for both the tractor and the piece of equipment. This carrying device is in the nature of a substitute for the tractor wheels. It may be the base of a small locomotive or it may take any form that will give stability to the combination as a whole. In the present instance is shown a full crawler type of base which changes the characteristics of the four wheel tractor into one having endless tracks.

With such a carrying base the size and weight of the equipment used with the tractor may be increased as provision is made for supporting greater weights sustaining greater strains. It will be noted in the present illustration that the beam 12 is utilized to support the double drum winch and that said beam also supports the forward portion of the tractor power plant. The upper portion of the winch frame is tied to, or braced from the axle housing of the tractor and there is an intermediate connection between the tractor and the winch frame consisting of the shelf 56 secured to the tractor casting 55 and the bolts 57 which are passed through the lower portion of the winch frame. When the nuts 60 are tightened up the tractor power plant is secured to the winch frame.

The importance of this mounting is the securing of greater steadiness in the completed structure, while the parts are still capable of easy disassemblage. They are nevertheless firmly secured together, the tractor power plant is secured to both the winch frame and the beam 12, the winch frame is secured to the beam 12 and also to the rear of the tractor, while the tractor itself is secured to other parts of the crawler attachment as will be appreciated. This construction makes for a secure and steady mounting of tractor and equipment upon the substituted base and enables a larger piece and a heavier piece of equipment to be used with the tractor. It is substantially removing the tractor as a mount for the equipment and utilizing the connection of the winch frame to both the front and rear of the tractor as steadying means for the tractor upon the supplemented base, that is important.

While the mounting of this kind is in itself a substantial improvement over ordinary mounts it has in the present instance a special application. It will be appreciated that the tractor, when mounted upon one of the wheel substitute bases referred to, retains a certain ability to oscillate upon that base. And this is desirable in order that shocks and strains due to the movement of the base shall not be too sharply imparted to the power plant of the tractor. It is not unusual to cushion a power plant and in Figure 3 of the drawing a means for cushioning is shown in the springs 14 and the connections thereof to the base. When however, a piece of equipment is to be used. It is desirable to have it always ready for driving from the tractor power plant and also desirable to have it steady with respect to the power plant in order that vibrations of the engine shall not jar the parts excessively. Therefore provision must be made for permitting the power plant to oscillate with respect to the rest of the combination and also for the tying up of the power plant and the equipment in a rigid manner when the equipment is to be used. The use of the equipment is usually desired when the tractor is at a standstill although with some forms of equipment this may not be true. It is true in connection with the winch shown in this application.

It will be appreciated therefore that the present mounting is especially designed to satisfy the requirements set forth for equipment of this kind. The winch frame is firmly supported upon the beam 12 and is carried with said beam from place to place. The loose connection between the casting 55 and the winch frame as well as the tie connection from the upper portion of the winch frame to the axle housing will permit the power plant to oscillate whenever it is desirable for it to do so. Upon simply tightening the nuts 60 it is possible to tie the power plant and the winch in a fixed or rigid relationship and this is accomplished for the purpose of using the equipment.

Another feature of the device herein described is its compactness for purposes of shipment. It will be noticed that no long attaching beams extending the length of the tractor are required. It will be further noticed that the frame is simply extended to provide a shouldered or heeled portion to set upon the beam 12 and that the extension controls and tie rods, and other parts are divided so that no long lengths of parts are necessary. It adapts itself to easy crating. Furthermore, many of the parts employed are stock structural parts enabling replacement thereof to be made when breakage occurs. Many of the parts are also designed to be substituted for similar parts in a line of equipment for tractors. For instance, the clamps 46 and 47 are capable of being revolved so that they might be utilized in the mounting of a rear end winch. The rod 49 may be utilized in a mounting for a front end single drum winch; the same is true of the casting 55 and the shelf 56. The winch parts, such as, spools, ring gears, pinions, bearings, and the like are capable of use in either rear end or front end single drum winches of like make. This idea of standardization is carried forward in this construction to a very great extent.

What is claimed is:

1. In a tractor-equipment combination, a tractor power plant, an equipment frame supported by said tractor adjacent the power plant, means for bracing said frame to a remote portion of the tractor, and means for either loosely or fixedly securing said frame directly to said power plant.

2. In a tractor-equipment combination, a tractor power plant, an equipment frame supported at its lower portion by said tractor at a point in front and below said power plant, means for bracing the upper portion of the frame to the tractor at a point to the rear of said power plant, and means for securing the frame directly to the power plant of said tractor.

3. In a tractor-equipment combination, a tractor power plant supported at one end upon a rigid part of said tractor, an equipment frame supported at its lower portion upon said rigid part to either side of said power plant, means for bracing the frame to the tractor in rear of said power plant, and means either loosely or fixedly securing said frame to said power plant.

4. In a tractor-equipment combination, a tractor comprising a power plant and a supporting base, the power plant being mounted on said base with a limited freedom of movement, a piece of tractor equipment supported upon and sustained by said base, and means for tying said equipment to said power plant in such a way that it may be utilized to permit said limited freedom of movement or to rigidly tie the power plant, base and equipment together.

5. In a tractor-equipment combination, a tractor comprising a power plant and a base of the crawler type, said power plant being supported upon the front end of said base, and a piece of tractor equipment supported upon said crawler base, tied to the body of the tractor and having a readily loosened connection to said power plant.

6. In a tractor-equipment combination, a tractor comprising a power plant and a base of the crawler type, said base having a cross beam upon which the front end of said power plant rests, and a piece of equipment for said tractor mounted upon said beam, and secured to said power plant in a manner to hold said power plant rigid upon said beam.

7. In a tractor-equipment combination, comprising a power plant and a base in the nature of a wheel-substitute, the power plant being mounted on the base in a manner to have a limited oscillating movement, a piece of equipment for said tractor mounted on the base and having a connection with the power plant capable of being employed either to permit the normal oscillatory movement between the power plant and base or of rigidly connecting the said power plant to the base.

8. The combination of claim 7 in which means are provided for driving moving parts of the equipment from the tractor power plant, when the connection between equipment and power plant is employed in aligning the power transmission elements.

9. The combination of claim 7 in which the equipment is also secured to the tractor at the rear thereof in such a manner as to brace the equipment vertically with respect to the power plant but permit the normal oscillatory movement between power plant and base.

10. In a tractor-winch combination, a tractor power plant, a base in the nature of a wheel substitute and a piece of equipment comprising a frame provided with a plurality of winding spools, said equipment being carried by the base and tied to the power plant and to the tractor body.

11. The combination of claim 10 in which the tractor power plant is supported at one end on a cross beam of the base, and the equipment is mounted on said beam.

12. In a tractor-winch combination, a tractor body comprising a power plant at its forward end and axle housings at its rear, a base in the nature of a wheel substitute supporting the power plant and the axle housings, a piece of winch equipment comprising a frame supported in front of the tractor power plant upon said base, means for bracing the winch frame with respect to the axle housing, and means for tying rigidly the tractor power plant to the winch frame.

13. The combination of claim 12 in which the tractor is provided with a power take-off and the winch with a driven element, power being transmitted from the power take-off to said driven element, and in which the power plant has a normal oscillatory movement with respect to the base, which is locked by the securing means between power plant and winch frame.

14. In a tractor-winch combination, a tractor, a winch frame, means for mounting said winch frame upon a tractor, a pair of winding drums mounted in said frame one above the other, a drive shaft mounted in said frame between said drums, drive elements on said drums and said drive shaft, whereby the drums are driven from said drive shaft, and means for driving said drive shaft from the tractor power plant.

15. The combination of claim 14 wherein means are provided for controlling the drive elements on the drive shaft whereby they may be shifted into and out of driving position with respect to the drive elements on the winding drums, either in unison or individually.

16. The combination of claim 14 in which the winding drums are formed that they may be interchanged with each other.

17. The combination of claim 14 in which the winding drums are provided with holding lugs and the frame with pawls, the winding drums, lugs and pawls being so formed that the winding drums may be interchanged in position with respect to each other.

18. The combination of claim 14 in which the winding drums are provided with brake drums and the frame with brake bands, the construction of winding drums, brake bands and brake control being such that the winding drums may be interchanged in position with respect to each other.

19. In a tractor-winch combination a tractor, a base in the nature of a wheel substitute for supporting said tractor, a piece of winch equipment for attachment to the front of said tractor comprising a frame supported upon said base braced against the front of said tractor and tied to said tractor power plant, a pair of winding drums mounted in vertical alignment in said frame, a drive shaft in said frame driven from the tractor power plant, shiftable pinions on said drive shaft for driving the winding drums, holding pawls mounted on said frame cooperating with lugs on the winding drums, brake drums on the winding drums and brake bands carried by the frame, and controls for the drive elements on said drive shaft whereby said elements may be shifted in unison or individually.

In testimony whereof we affix our signatures.

WM. D. SHOEMAKER.
FRANK L. YOUNG.